United States Patent [19]

Fairlie-Clarke et al.

[11] Patent Number: 4,858,937
[45] Date of Patent: Aug. 22, 1989

[54] PRESSURE CONTROLLER FOR A BUFFER FLUID SEAL

[76] Inventors: Anthony C. Fairlie-Clarke, 1 Abercorn Drive, Edinburgh, EH8 7JR, Scotland; Charles O. Etheridge, 3730 Cypress Hill Dr., Spring, Tex. 77388

[21] Appl. No.: 40,775
[22] PCT Filed: Aug. 15, 1986
[86] PCT No.: PCT/GB86/00488
§ 371 Date: Jun. 8, 1987
§ 102(e) Date: Jun. 8, 1987
[87] PCT Pub. No.: WO87/01171
PCT Pub. Date: Feb. 26, 1987

[30] Foreign Application Priority Data

Aug. 15, 1985 [GB] United Kingdom ............... 8520526

[51] Int. Cl.[4] ............... F16J 15/40; F16K 31/122; F16K 37/00
[52] U.S. Cl. ............................ 277/2; 91/1; 91/25; 91/390; 137/554; 251/61.3; 277/3; 277/27; 277/28; 277/59; 277/135
[58] Field of Search ............... 251/61.3; 277/3, 2, 277/28, 59, 135, 29; 91/1, 24, 25, 390, 394, 396; 137/554, 553

[56] References Cited

U.S. PATENT DOCUMENTS

| | | | |
|---|---|---|---|
| 933,400 | 9/1909 | Stance et al. | 277/3 |
| 946,408 | 1/1910 | Stance et al. | 277/3 |
| 1,158,029 | 10/1915 | Dantsizen | 91/390 X |
| 2,769,912 | 11/1956 | Lupfer et al. | 91/25 X |
| 3,568,436 | 3/1971 | Heffner et al. | 277/28 X |
| 4,483,508 | 11/1984 | Marsh et al. | 251/61.3 |

FOREIGN PATENT DOCUMENTS

| | | |
|---|---|---|
| 2704740 | 8/1977 | Fed. Rep. of Germany . |
| 1528905 | 6/1968 | France . |
| 2576887 | 8/1986 | France . |

*Primary Examiner*—Allan N. Shoap
*Attorney, Agent, or Firm*—Stephen G. Rudisill

[57] ABSTRACT

The sealing apparatus is designed to automatically maintain the pressure of a buffer fluid above that of the sealed fluid. The apparatus consists of a cylinder (1) which has a movable piston (4, 5) therein. The piston (4, 5) is coupled to a valve shaft (8) and a first chamber (Z) in communication with sealed fluid is disposed on one side of the piston and a second chamber (Y) is on the other side of the piston for continuous communication with the buffer fluid. Recharging means in the form of a valve (12) and third chamber (X) which contains buffer fluid is a pressure greater than (Y) are associated with the second chamber (Y) so that in response to failure of seals the buffer fluid pressure drops in chamber (Y) and the pistons (4, 5) rise so that shaft mounted valve (12) is disengaged from valve seat (14) allowing high pressure buffer fluid to be transferred from chamber X to chamber Y. The buffer fluid forces the piston down and closes the valve to maintain the pressure of the buffer fluid above the sealed fluid pressure. The apparatus also includes remote indicating means (9, 10) for providing remote indication of excessive leakage from the auxiliary or main seals or if the valve is leaking.

15 Claims, 3 Drawing Sheets

PRESSURE CONTROLLER FOR A BUFFER FLUID SEAL

This invention relates to sealing apparatus for fluids.

It is common practice to provide a seal arrangement for a shaft or the like in which lubrication for the seals is being provided by the sealed fluid. However, if lubrication from the sealed fluid is insufficient (e.g. in the case of the sealed fluid being a gas), or undesirable in the case of the sealed fluid containing grits and contaminants, then a sealing arrangement can be utilised, where auxiliary seals are fitted inboard of the main seals and a buffer fluid is introduced between the main seal and auxiliary seal. It is advantageous if this buffer fluid is maintained at a pressure above that of the sealed fluid so that any leakage across the auxiliary seal is from the buffer fluid to the sealed fluid effectively excluding any contamination of the buffer fluid from the sealed fluid. This provides a favourable operating environment for the main seals and keeps the sealing surfaces of the auxiliary seals clear of grits and contaminants. The buffer space also provides high integrity containment of the sealed fluid since any failure of the seals will result in buffer fluid leaking into the sealed fluid, or to the environment, but sealed fluid will not leak to the environment except in the event of multiple failures.

An object of the present invention is to provide a means for automatically maintaining the buffer fluid at a pressure above that of the sealed fluid. This is achieved by using a device which supplies or maintains pressure fluid at a specified pressure differential relative to a reference fluid also pressurised with or without flow taking place.

According in one aspect of the present invention there is provided apparatus for automatically maintaining a buffer fluid at a pressure above that of a sealed fluid comprising a piston moveable within a cylinder; a first chamber on one side of the piston for continuous communication with the sealed fluid; a second chamber on the other side of said piston for continuous communication with the buffer fluid; and recharging means associated with said second chamber for automatically modifying said buffer fluid pressure in relation to variation in the sealed fluid pressure in order to maintain the pressure of the buffer fluid at a pressure greater than that of the sealed fluid.

An embodiment of the present invention will now be described, by way of example, with reference to the accompanying drawings in which:

FIG. 1 (b) illustrates an improved form of prior art seal;

Figure 1A:
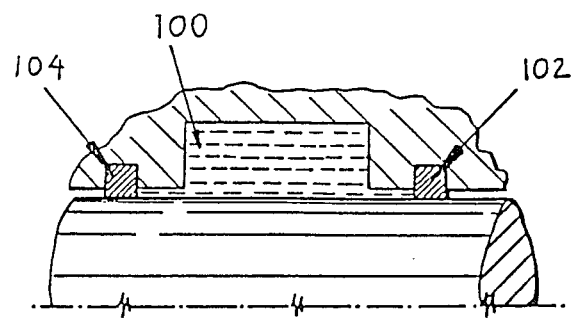
FIG. 1 (a) illustrates a basic form of prior art seal.
Figure 1B:
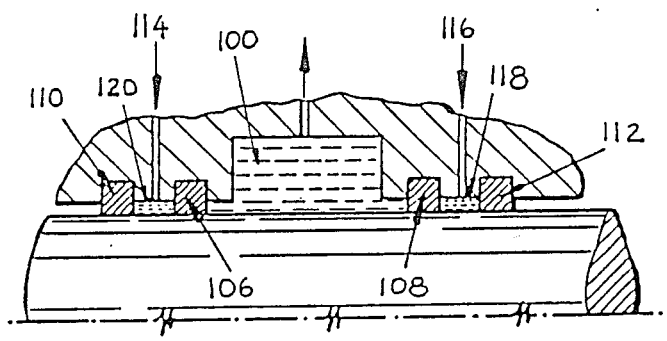

Referring to the drawings, FIG. 1 (a) illustrates a simple prior art seal arrangement, including seals 102, 104 in which lubrication is provided by the sealed fluid 100. FIG. 1 (b) illustrates an improved form of prior art seal referred to hereinabove in which a buffer fluid is introduced via ports 114, 116 into cavities 120, 118 between auxiliary seals 106, 108 and main seals 110, 112.

Figure 2:
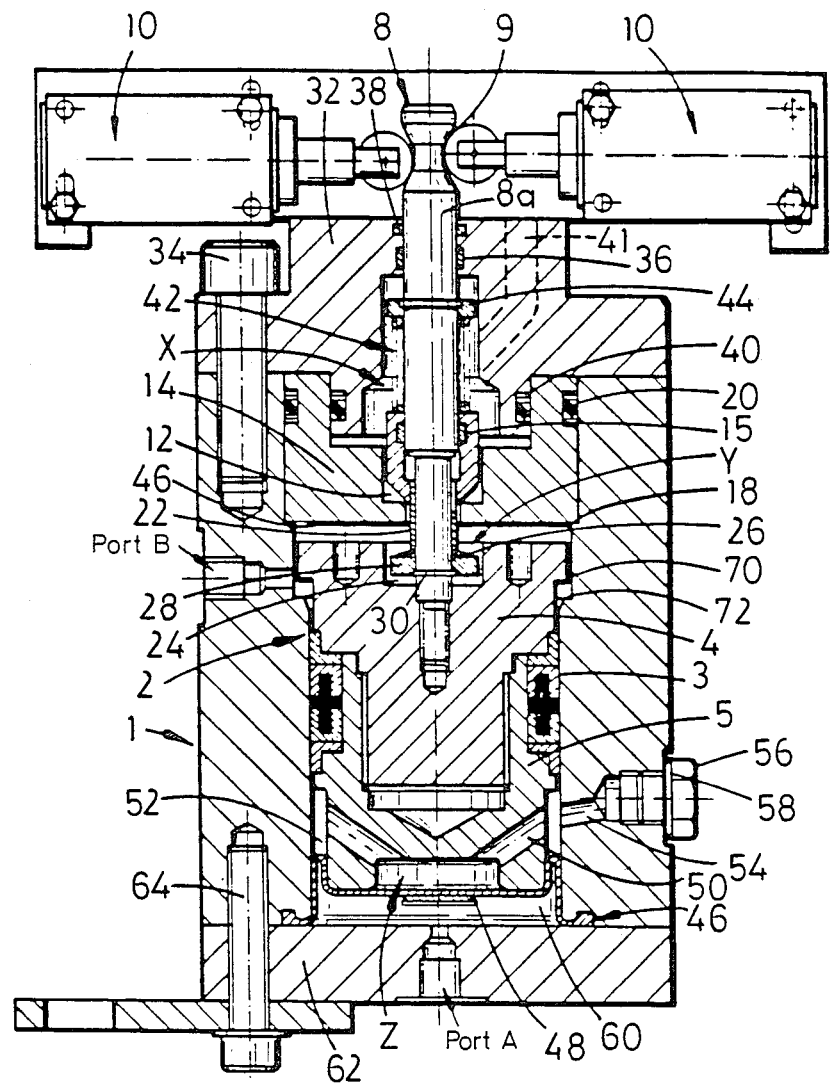
FIG. 2 is a sectional view of an embodiment of the apparatus in accordance with the present invention.
Figure 3:
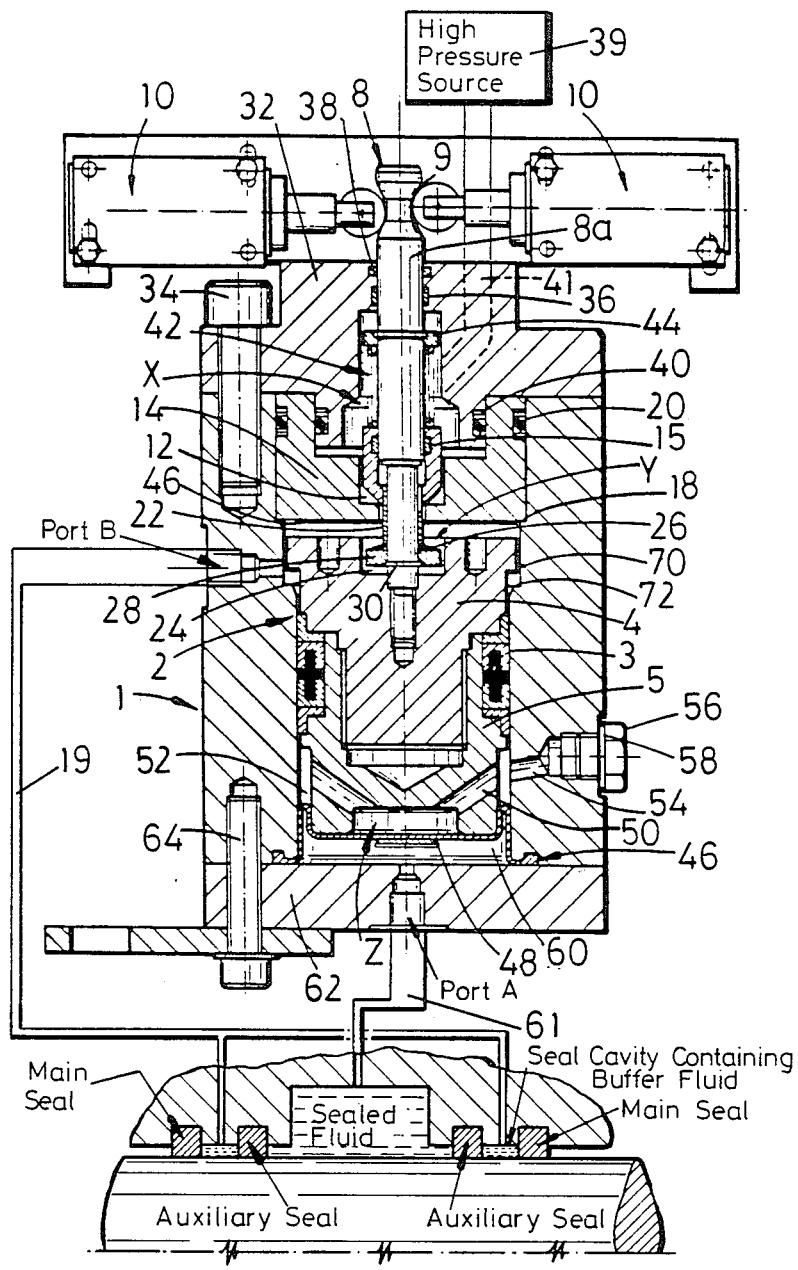
FIG. 3 is a diagrammatic representation showing the relationship of FIG. 1b and FIG. 2 with associated manifold connections.

The arrangement of an embodiment of the present invention is shown in FIG. 2 which illustrates a cylinder block 1, the cylinder of which is counterbored. FIG. 3 shows the embodiment of FIG. 2 in combination with a seal shown in FIG. 1b with appropriate manifold connections as will be later described in detail.

The lower portion of the cylinder is positively divided into upper and lower chambers by a piston 2, generally indicated by reference numeral 2 containing a double-acting piston seal 3. The piston 2 consists of an upper piston half 4 and a lower piston half 5 with the seal 3 being disposed between the outside of the piston half 5 and the interior of cylinder block 1. The piston 2 has piston rod or valve shaft 8 coupled to the upper piston half 4. An undercut 9 on the upper portion of the valve shaft 8 acts as a cam on which a pair of microswitches 10 run giving indication of shaft overtravel in either direction. The valve shaft 8 passes through a valve 12 to engage an upper piston 4. The valve 12 is mounted on the shaft 8 and is adapted to engage with a valve seat 14. The inner surface of the valve 12 is sealed to shaft 8 by O-ring 15. The valve 12 is normally seated in valve seat 14 which rests on shoulders 18 machined in the inside of block 1. A back-up sealing ring 20 is disposed between the valve seat 14 and the block 1. Disposed between the valve 12 and shaft 8 is a coaxial sleeve 22 which passes through valve seat 14 and terminates in a recess 24 in the upper piston half 4. The lower portion of the sleeve rests on a Belleville spring washer 26 supported on a washer retainer 28 and held in place by a circlip 30.

The valve seat 14 is retained in position by end cap 32 which is coupled to the cylinder block 1 by a plurality of threaded fasteners 34, only one of which is shown. The end cap 32 houses a gland seal 36 which seats on the upper portion 8a of the valve shaft 8, a scraper ring 38 which excludes contaminants from the end gland seal 36, and a static anti-extrusion O-ring 40 which seals on the interior valve seat 14.

The interior of the end cap 32, valve seat 14 and valve 12 define an upper annular chamber X which contains fluid at a pressure above buffer fluid and which is supplied via a port 41 shown in broken outline. A coil spring 42 is wound around shaft 8 between a spring retaining clip 44 and the top of valve 12 for urging the valve 12 into contact with valve seat 14, in the event of leakage of sealed fluid as will be described.

The lower surface 46 of valve seat 14, the upper surface of piston half 4 and interior of block 1 define a lower shallow annular chamber Y which communicates with a radial port B 122 in sidewall of block 1. The chamber Y also communicates with chamber X via the valve 12 when spaced from the valve seat 14 as will be described. The chamber Y is adapted to be connected via port 122 and conduit 19 to the buffer fluid seal cavities of the arrangement shown in FIG. 3 between the main seals and the inboard auxiliary seals.

Disposed between the lower end of piston half 4 and cylinder block 1 is a flexible diaphragm 46 which effectively excludes contaminants in the fluid being sealed from the cylinder bore. The diaphragm 46 carries a diaphragm pad 48. The piston half 5 is recessed at its lower end to define a lower chamber Z between the diaphragm 46 and the piston half 5. The chamber Z communicates via sloping bores 50 with an annular space 52 between piston half 5 and block 1. The annular space 52 communicates with a bore 54 in the cylinder block 1 through which lubricant can be charged into chamber Z. Bore 54 is counterbored, tapped and sealed from the atmosphere using plug 56 and bonded washer 58.

Disposed beneath diaphragm 46 is a chamber 60 defined by lower end cap 62 which is secured by a plurality of radial bolts 64 to the block 1. The end cap 62 has a port A which permits communication between the chamber 60 and the fluid being sealed which is connected to port 124 via conduit 61, as best seen in FIG. 3. The diaphragm pad 48 is designed to prevent the diaphragm 46 from being sucked into port 124 in the event that the pressure of the fluid being sealed drops.

The annular chamber Y contains buffer fluid which is at a higher pressure than the sealed fluid because of pressure intensification from the full piston area on the sealed fluid side of the piston acting on the lesser annular area on the buffer fluid side of the piston. As described, the chamber X also contains buffer fluid which is supplied from a high pressure external source 39, as best seen in FIG. 3 via port 41 and which is at a pressure greater than that of the buffer fluid in the middle chamber Y.

Under normal operation, the upper chamber X is sealed from the lower chamber Y by the valve 12 seating on the valve seat 14. In the event of any leakage at the auxiliary or the main seals of the arrangement of FIG. 1 (b) then the buffer fluid pressure in chamber Y will drop and the piston halves 4, 5, valve shaft 8, washer retainer 28 and coaxial sleeve 22 travel upwards until coaxial sleeve 22 engages and lifts the valve 12 from the valve seat 14 allowing buffer fluid, at a higher pressure in the chamber X, to transfer to the middle chamber Y. This fluid will then cause the piston halves 4, 5 and valve shaft 8 to move downwards bringing the valve 12 back into seating engagement with valve seat 14 to prevent further transfer of fluid from the chamber X to the middle chamber Y.

In the event that there is a pressure drop in the sealed fluid at port 124 the buffer pressure in chamber Y forces piston and valve shaft 8 down with the valve shaft 8 sliding down through valve 12. The spring 42 compresses and urges the valve to remain seated to prevent fluid from chamber X entering chamber Y. The Belleville spring washer 26 is biased to counteract the spring force of coil spring 42 so that the valve 12 engages progressively and positively on the valve seat 14.

Remote indications are provided for the following cases:

In the event of a failure of the valve 12 fluid from the upper chamber X, which is automatically replenished from an external source, transfers to the middle chamber Y causing the piston halves 4, 5 and valve shaft 8 to travel downwards. This causes the cam profile 9 on the upper portion of the valve shaft 8 to trigger one of the limit switches 10 thus providing a remote indication of excessive leakage. Further downward movement of the piston and valve shaft is limited by engagement of piston shoulders 70 with an annular shoulder 72 in the block. In the event of excessive leakage from the auxiliary or main seals of an arrangement as shown in FIG. 1 (b), the external source of buffer fluid to the chamber X may be exhausted. This would cause the piston halves 4, 5 and valve shaft 8 to travel upwards causing the cam profile 9 on the upper portion of the valve shaft 8 to trigger the other limit switch 10 thus providing remote indication of excessive leakage from the auxiliary or main seals. Upward movement of the piston is limited by the piston engaging with the lower surface 46 of valve seat 16, which is secured to the top end cap 32.

During assembly of the apparatus the spring 42 is fully extended and the valve 12 in contact with the valve seat. The diaphragm 46 is positioned flat against the lower surface of the piston half 5. Bleed Plug 56 is removed and the interspace is filled with 'Hyvis 10' oil to ensure that no air pockets remain. Preferably the micro-switches 10 can be set to trip at ±5 mm of movement of valve shaft 10.

The apparatus of FIG. 2 can be used to maintain automatically the buffer fluid of an arrangement such as shown in FIG. 1 (b) at a pressure greater than that of the sealed fluid. This is achieved by utilising the sealed fluid pressure as the source pressure in a pressure intensifier while ensuring no contamination of the buffer fluid from the sealed fluid. The apparatus also automatically compensates for any loss of buffer fluid due to leakage and automatically adjusts buffer fluid pressure in relation to the pressure of the fluid being sealed. It will be appreciated that remote indicating means can be provided by electromagnetic means, for example LVDT (Linear Variable Differential Transformer) or by optical means such as a light source and photodetector to detect excessive shaft travel in either direction.

We claim:

1. Apparatus for automatically maintaining a buffer fluid at a pressure above that of a sealed fluid comprising a piston moveable within a cylinder; a first chamber on one side of the piston for continuous communication with the sealed fluid; a second chamber on the other side of said piston for continuous communication with the buffer fluid; and recharging means associated with said second chamber for automatically modifying said buffer fluid pressure in relation to variation in the sealed fluid pressure in order to maintain the pressure of the buffer fluid at a pressure greater than that of the sealed fluid, said recharging means including a third chamber having buffer fluid at a pressure greater than that in said second chamber, said third chamber being coupled to said second chamber via valve means which includes a valve responsive to movement of said piston so that in the event of a reduction in pressure of said buffer fluid upward movement of said piston causes said valve to open whereby higher pressure fluid from said third chamber transfers to said second chamber to force said piston down and to close said valve to maintain said buffer fluid pressure above said sealed fluid pressure.

2. Apparatus as claimed in claim 1 wherein said first chamber is formed so that said sealed fluid acts on substantially the entire piston diameter.

3. Apparatus as claimed in claim 1 or 2 wherein said second chamber is annular and the annular area on which said buffer fluid acts is less than the area on which the sealed fluid acts.

4. Apparatus as claimed in claim 1 wherein said piston is coupled to a valve shaft passing through said valve and generally parallel to the cylinder axis, said valve shaft carrying said valve and passing through a valve seat, and in the absence of flow said valve being engaged in said valve seat.

5. Apparatus as claimed in claim 4 wherein said valve shaft includes resilient biasing means coupled to said valve, said resilient biasing means being biased to urge said valve towards said valve seat.

6. Apparatus as claimed in claim 5 wherein said valve shaft includes resilient force balancing means for counteracting said resilient biasing means to provide progressive and positive contact between said valve and said valve seat.

7. Apparatus as claimed in claim 6 wherein said resilient force balancing means is a resilient washer disposed on said shaft within said second chamber.

8. Apparatus as claimed in claim 4 including remote indicating means for providing an indication of valve failure.

9. Apparatus as claimed in claim 8 wherein said indicating means includes a cam portion on a upper portion of said valve shaft to reduce the diameter of said portion of said valve shaft, and a limit switch coupled to said valve shaft and responsive to changes in valve shaft diameter so that when said shaft travels downwards, movement of said cam portion actuates said limit switch to provide a remote indication of failure.

10. Apparatus as claimed in claim 4 wherein said sealed fluid is substantially contained between a first and a second auxiliary seal, and wherein said buffer fluid is substantially contained between a first main seal and said first auxiliary seal, and between a second main seal and said second auxiliary seal.

11. Apparatus as claimed in claim 10 including remote indicating means for providing a remote indication of excessive leakage from said auxiliary or main seals.

12. Apparatus as claimed in claim 11 wherein said indicating means includes a cam portion on an upper portion of said valve shaft to reduce the diameter of said portion of said valve shaft, and a limit switch coupled to said valve shaft and responsive to changes in valve shaft diameter so that when in the event of buffer fluid in said third chamber being exhausted said valve shaft travels upwards so that said cam portion actuates said limit switch to provide a remote indication of leakage from the auxiliary or main seals.

13. Apparatus as claimed in claim 1 including remote indicating means for providing an indication of valve failure.

14. Apparatus as claimed in claim 1 wherein said sealed fluid is substantially contained between a first and a second auxiliary seal, and wherein said buffer fluid is substantially contained between a first main seal and said first auxiliary seal, and between a second main seal and said second auxiliary seal.

15. Apparatus as claimed in claim 14 including remote indicating means for providing a remote indication of excessive leakage from the auxiliary or main seals.

* * * * *